United States Patent [19]
Woodruff

[11] 4,391,525
[45] Jul. 5, 1983

[54] INTERFEROMETER
[75] Inventor: Robert A. Woodruff, Goleta, Calif.
[73] Assignee: Ball Corporation, Muncie, Ind.
[21] Appl. No.: 83,315
[22] Filed: Oct. 10, 1979
[51] Int. Cl.³ .......................... G01B 9/02; G02B 27/10
[52] U.S. Cl. ...................................... 356/346; 350/169
[58] Field of Search .......................... 356/346; 350/169
[56] References Cited
U.S. PATENT DOCUMENTS 3,809,481  5/1974  Schindler ............................ 356/346
4,181,440  1/1980  Schindler ............................ 356/346
4,193,693  3/1980  Schindler ............................ 356/346

*Primary Examiner*—Bruce Y. Arnold
*Attorney, Agent, or Firm*—Ball Corporation

[57] ABSTRACT

An interferometer having beamsplitting and reflective coatings on the same surface of a beamsplitter member. The fixed length path of the interferometer includes a compensator matched to the beamsplitter member, a Cat's Eye Retroreflector, the reflective coating and a retro-mirror. The variable length path of the interferometer includes a moving coil mirror, a movable Cat's Eye Retroreflector and the retro-mirror.

31 Claims, 1 Drawing Figure

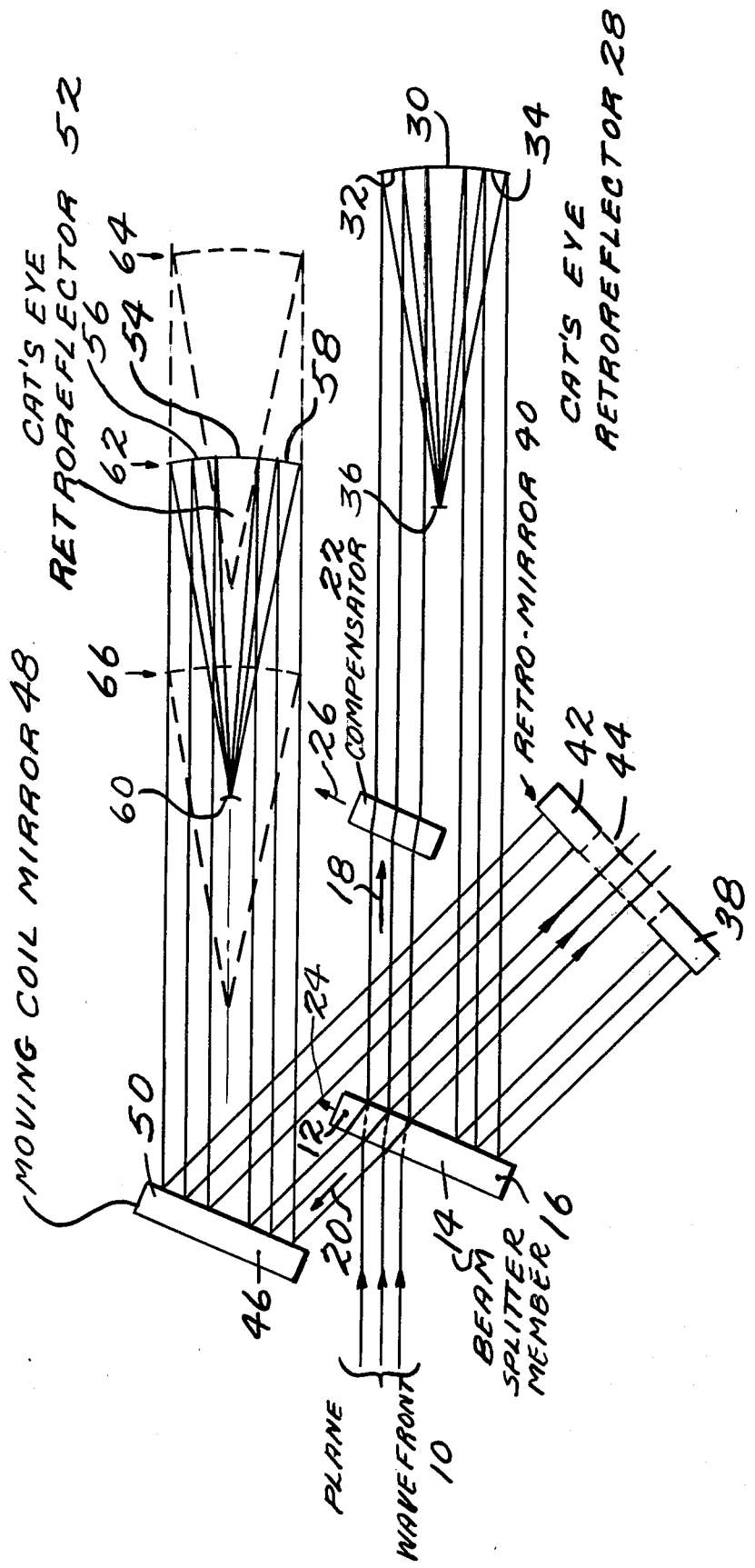

INTERFEROMETER

BACKGROUND OF THE INVENTION

This invention relates in general to interferometers and specifically to Michelson type interferometers. Even more specifically, this invention relates to Michelson type double pass interferometers utilized to measure the spectral intensity distribution of an incoming ray. Michelson type interferometers split a source beam into two parts, each part traversing a different optical path and then reuniting to produce interference. One of these optical paths includes a mirror mounted on an adjustable stage, the adjustment of which allows its path length to be changed.

Relatively compact spectrometers including Michelson type interferometers which are relatively insensitive to vibration and element misalignment are known. However, the prior art optical configurations are disadvantageous in that they require the use of a very large and thick beamsplitter and a 45° angle of incidence of the incident beam with respect to the beamsplitter in order to achieve proper splitting of the optical beams. It is desirable to be able to use a smaller beamsplitter and an angle of incidence less than 45°, and the use of such a beamsplitter as described is not possible in prior art optical configurations.

SHORT STATEMENT OF THE INVENTION

It is therefore the primary object of the present invention to provide an interferometer utilizing a smaller beamsplitter than is possible with prior art configurations.

This object is achieved by providing an interferometer utilizing a beamsplitter coating and reflecting coating, both disposed on a common surface. The coatings are therefore necessarily coplanar. An incident light beam irradiates, with an angle of incidence of less than 45° a wedged KBr beamsplitter plate. A germanium beamsplitting coating is deposited on a portion of the rear surface of the plate to split the incident light into two separate wavefronts. The two wavefronts are directed along respective separate paths, one of fixed and one of variable length.

The light wavefront transmitted through the beamsplitter follows the path having a fixed length. The light wavefront passes through a KBr compensator plate matched to the beamsplitter plate in material, in optical thickness and in wedge angle. The compensated light wavefront is reflected back and collimated by a Cat's Eye Retroreflector (CER) to irradiate the reflective coating on the same KBr beamsplitter surface supporting the germanium beamsplitting coating. Deposition on a common surface insures that the reflective coating and beamsplitting coating are coplanar. The light wavefront propagating in the fixed length path is therefore directed against a large flat retro-mirror causing the light wavefront to retrace its optical path back to the beamsplitting coating.

The light wavefront originally reflected by the beamsplitting coating follows the variable length interferometer path. The wavefront is initially reflected by the beamsplitting coating on the KBr beamsplitter plate towards a portion of a diagonal mirror supported by a moving coil actuator. This diagonal mirror reflects the wavefront toward a second CER mounted on a mechanism for changing its position. The position of the second CER determines the path length of the variable length path. Reflections from the second CER are directed to a previously unused portion of the moving coil mirror. The moving coil mirror, in turn, reflects the light wavefront to an unused portion of the retro-mirror. The retro-mirror causes the wavefront incident upon it to retrace its optical path back to the beamsplitting coating where the light wavefronts from the separate fixed and variable length optical paths of the interferometer recombine. The recombined optical wavefront is again divided at the beamsplitting coating with half of the radiant energy returning towards the source and half directed through a central aperture in the retro-mirror.

BRIEF DESCRIPTION OF THE DRAWING

Other objects, features and advantages of the present invention will become more apparent from the following detailed description of the preferred embodiment, the appended claims, and the accompanying drawing wherein:

The sole FIGURE is a diagrammatic optical wave trace view of the interferometer according to the present invention.

DESCRIPTION OF THE PREFERRED EMBODIMENT

Referring now to the FIGURE, an incident plane wavefront 10 impinges upon the upper portion 12 of a beamsplitter member 14. Beamsplitter member 14 comprises a single wedged KBr plate having an upper portion 12 and a lower portion 16. A germanium beamsplitting coating is deposited on the rear surface of upper portion 12, and a reflective coating is disposed on the rear surface of lower portion 16. A portion of the incident wavefront travels in each of two paths.

Plane wavefront 10, incident upon the front surface of beamsplitter member upper portion 12 is split by the action of the germanium beamsplitting coating into two separate light wavefronts: a transmitted wavefront, indicated by an arrow 18; and a reflected wavefront indicated by arrow 20. The transmitted wavefront propagates along a fixed length optical path of the interferometer and the reflected wavefront propagates along a variable length optical path of the interferometer. After propagating along their respective optical paths, the transmitted and reflected wavefronts are recombined at the beamsplitting coating of beamsplitter member 14.

The transmitted wavefront, propagating along the fixed length path of the interferometer, first passes through a compensator 22. Compensator 22 is a KBr plate matched to beamsplitter member 14 in optical thickness and in wedge angle and compensates for the thickness of beamsplitter member 14 by providing a phase shift to transmitted light equal to the phase shift encountered by light passing through the beamsplitter member. The wedge angle is chosen large enough to reduce channel spectra effects below a tolerable limit. The optical thicknesses are matched to eliminate chirping. The respective relative direction of the wedge angles of the beamsplitter member 14 and compensator 22 are indicated by arrows 24 and 26, respectively. Compensator 22 and beamsplitter member 14 are wedged to the same angle to maintain elimination of chirping over the full aperture.

The transmitted wavefront, after passing through compensator 22, is reflected and collimated by a Cat's Eye Retroreflector (CER) 28. CER 28 includes a primary mirror 30 having upper and lower portions 32 and 34, respectively, and a secondary mirror 36. The transmitted wavefront, having passed through compensator 22, is incident upon upper portion 32 of primary mirror 30 and is reflected toward secondary mirror 36. Secondary mirror 36 reflects the wavefront toward lower portion 34 of primary mirror 30. From the lower portion 34 of primary mirror 30, the light wavefront is reflected toward beamsplitter member lower portion 16.

As stated above, the rear surface of beamsplitter member lower portion 16 is covered with a reflective coating. This reflective coating is on the same KBr surface supporting the germanium beamsplitting coating, thus assuring that these two coatings are coplanar. The light wavefront incident upon this reflective coating on beamsplitter lower portion 16 is reflected toward a lower portion 38 of a retro-mirror 40.

Retro-mirror 40 is a large flat mirror, including an upper portion 42 and an aperture 44, as will be discussed hereafter. Light incident upon lower portion 38 of retro-mirror 40 is reflected back toward beamsplitter member lower portion 16 thereby causing it to retrace its optical path back to the beamsplitting coating located on the rear surface of beamsplitter member upper portion 12. Thus, the fixed length optical path is defined by the optical ray trace from beamsplitter member upper portion 12 through compensator 22, CER 28, beamsplitter member lower portion 16 and lower portion 38 of retro-mirror 40.

In a similar manner, the variable length optical path of the interferometer is defined. A portion of plane wavefront 10 is reflected in a direction indicated by arrow 20 by the beamsplitting coating on the rear surface of beamsplitter member upper portion 12. This reflected beam is transmitted toward the lower portion 46 of a moving coil mirror 48. Moving coil mirror 48 also includes an upper portion 50, as will be discussed hereafter. Light directed toward lower portion 46 of moving coil mirror 48 is reflected to a second CER 52. CER 52 is mounted on a mechanism (not shown) for varying its position and consequently the optical path length. Reflections from CER 52 are directed toward upper portion 50 of moving coil mirror 48.

CER 52 includes a primary mirror 54 having upper and lower portions 56 and 58, respectively, and includes a secondary mirror 60. Light from lower portion 46 of moving coil mirror 48 is directed toward lower portion 58 of primary mirror 54 of CER 52. Light reflected from lower portion 58 of primary mirror 54 is directed toward secondary mirror 60 wherefrom it is reflected toward upper portion 56 of primary mirror 54. Upper portion 56 of primary mirror 54 reflects light toward upper portion 50 of moving coil mirror 48.

From upper portion 50 of moving coil mirror 48 light is reflected toward upper portion 42 of retro-mirror 40. Retro-mirror 40 causes light incident upon it to retrace its optical path back to the beamsplitting coating on upper portion 12 of the rear surface beamsplitter member 14. Thus, the variable length optical path is defined and includes the upper portion 12 of the beamsplitter member 14, lower portion 46 of moving coil mirror 48, CER 52, upper portion 50 of moving coil mirror 48 and upper portion 42 of retro-mirror 40.

At the beamsplitting coating on the rear surface of beamsplitter member 14, light wavefronts which have traveled along and retraced the fixed length path and light wavefronts which have traveled along and retraced the variable length path are recombined.

The recombined optical wavefront is again divided at the beamsplitting coating on the upper portion 12 of the rear surface of beamsplitter member 14. Half of the radiant energy returns toward the source of plane wavefront 10 and the other half is directed through central aperture 44 of retro-mirror 40 for use by companion optical systems.

As stated, CER 52 is mounted on a mechanism (not shown) for effecting adjustment of the variable length path. The mechanism allows CER 52 to be moved from a central position designated by arrow 62 to either a far position, designated by arrow 64, or to a close position designated by arrow 66 or to any position in between.

The interferometer is made insensitive to tilting of the moving elements by use of CERs 28 and 52. Similarly, the instrument is rendered insensitive to lateral displacement of the CERs by causing the respective wavefronts to retrace the fixed and variable length paths. The use of a single retro-mirror common to both the fixed and variable length paths and reflection symmetry at the beamsplitter member and moving oil mirror 48 also combine to reduce sensitivity to tilting or to the translation of any optical component. By virtue of the optical design as described herein, the precision of the system is determined similarly by the components themselves rather than in the accuracy of their relative positional relationship to one another.

The configuration as set forth has been specifically optimized for a small beamsplitter member 14 that is 15 millimeters thick. A 22.5° angle of incidence of plane wavefront 10 with respect to beamsplitter member 14 was used. Compensator plate 22 was matched in both optical thickness and wedge angle to beamsplitter member 14. The wedge angle of beamsplitter member 14 and compensator 22 were matched to within 3.3 arc seconds to control chirping (optical phase dispersion).

Highly advantageous results are achieved by placing the beamsplitter and reflective coatings on the same face of beamsplitter member 14. For the beamsplitting coating and reflective coating to be disposed on opposite sides of the beamsplitter member 14, the wedge angle would have to be less than 0.5 arc second. Thus, as a practical matter, no wedging to reduce channel spectra would be possible. However, the present design utilizes a beamsplitting coating, and reflective coatings are disposed on the same surface of beamsplitter member 14 so that wedging can be effected to eliminate channel spectra and to simplify beamsplitter manufacture. The use of a smaller angle of incidence than is used in the prior art reduces polarization and, in addition, allows for reduced beamsplitter size. The smaller angle also increases the allowed error in wedge matching and reduces the sensitivity to beamsplitter and to compensator tilting. Typically, the compensator wedge must match the beamsplitter wedge to 2.2 arc seconds for an angle of incidence of 45°, or to 3.3 arc seconds if the angle of incidence is 22.5°.

Channel spectra are eliminated by wedging and tilting each transmissive element. Various benefits result from these specific design features of the interferometer according to the present invention.

It should be apparent that the present invention provides a unique interferometer having improved operating characteristics. The use of self aligning components render the interferometer relatively immune to mechanical, thermal, and acoustical disturbances. By optimizing the optical configuration, the design constraints placed on the beamsplitter are eased. By the use of a small beamsplitter there is achieved a better wavefront, easier mounting, lower cost of production and, in addition, a smaller moving coil mirror can be used. The use of a 22.5° beamsplitter/compensator angle of incidence allows the use of a smaller beamsplitter, causes lower polarization, allows for relaxed mounting and manufacturing tolerances, and further allows for the use of a small moving coil mirror. By placing the beamsplitting coating on the same surface as the reflective coating, wedge tolerances are significantly reduced and the beamsplitter member 14 can be manufactured more easily and inexpesively. By using a small moving coil mirror, better frequency response is achieved. In addition, there is less inertia and a lower vibration input.

Other embodiments and modifications of the present invention will be readily apparent to those of ordinary skill in the art having the benefit of the teaching presented in the foregoing description and drawing. For example, the beamsplitter substrate can be fabricated from NaCl or CsI or any other suitable material when utilizing the optical configuration according to the present invention. It is, therefore, to be understood that this invention is not to be unduly limited and that such modifications are intended to be included within the scope of the appended claims.

What is claimed is:

1. An interferometer comprising:
a beamsplitter member including a surface;
a beamsplitting coating disposed on a first portion of said beamsplitter member surface for splitting incident light into a transmitted beam and a reflected beam, said transmitted beam propagating along a first optical path of said interferometer and said reflected beam propagating along a second optical path of said interferometer;
a compensator positioned in said first optical path;
a first reflector for reflecting light transmitted by said beamsplitter;
a second reflector formed by a coating positioned upon a second portion of said surface of said beamsplitter member, such that said second reflector and said beamsplitting coating are substantially coplanar, said second reflector for reflecting light from said first reflector;
a retro-reflector for reflecting light transmitted thereto from said second reflector back toward said second reflector, said light retracing its optical path back to said beamsplitter;
a third reflector for reflecting light reflected by said beamsplitter;
a fourth reflector for reflecting light reflected by said third reflector back to said third reflector and then to said retroreflector, said retroreflector reflecting light back toward said third reflector, said light retracing its optical path back to said beamsplitting coating along said second optical path, said transmitted beam and said reflected beam being recombined at said beamsplitting coating.

2. An interferometer according to claim 1 wherein said fourth reflector is movable.

3. An interferometer according to claim 2 wherein said fourth reflector is a Cat's Eye Retroreflector.

4. An interferometer according to claim 1 wherein said third reflector comprises a moving coil mirror.

5. An interferometer according to claim 1 wherein said first reflector comprises a Cat's Eye Retroreflector.

6. An interferometer according to claim 1 wherein said fourth reflector comprises a Cat's Eye Retroreflector.

7. An interferometer according to claim 1 wherein said compensator is positioned between said beamsplitter member and said first reflector.

8. An interferometer according to claims 1 or 7 wherein said beamsplitter member and said compensator are wedged in like amounts to eliminate channel spectral interference.

9. An interferometer according to claim 1 wherein the angle of incidence of said incident light is less than 45°.

10. An interferometer according to claim 1 wherein said beamsplitter member comprises a KBr plate and a layer of germanium affixed thereto.

11. An interferometer according to claim 10 wherein said compensator is made of KBr.

12. An interferometer according to claim 1 wherein said beamsplitter member and compensator are made of NaCl.

13. An interferometer according to claim 1 wherein said beamsplitter member and compensator are made of CsI.

14. An interferometer comprising:
a flat or wedge-shaped plate having two approximately parallel planar surfaces and a beamsplitter disposed on a portion of one planar surface thereof for splitting the wavefront of optical radiation incident thereon into a first optical wavefront and a second optical wavefront;
a first plurality of optical elements constituting a first optical path for said first optical wavefront to propagate through, said first plurality of optical elements including at least one optical reflector element that is coplanar with said beamsplitter and formed on another portion of said one planar surface of said plate;
a second plurality of optical elements constituting a second optical path for said second optical wavefront to propagate through; and
said first and second pluralities of optical elements positioned such that said first and second optical wavefronts, having propagated through said first and second optical paths respectively, recombine at said beamsplitter.

15. An interferometer according to claim 14 wherein said first optical path traverses said plate only once and wherein said first plurality of optical elements includes a separate compensator plate which is twice traversed by said first optical path.

16. An interferometer according to claim 15 wherein said reflector is a reflective coating formed on another portion of said one planar surface of said plate.

17. An interferometer according to claim 14 wherein said beamsplitter comprises:
a beamsplitting coating disposed on a portion of said one surface of said plate.

18. An interferometer according to claim 17 wherein said plate is a KBr plate.

19. An interferometer according to claim 17 wherein said plate is a NaCl plate.

20. An interferometer according to claim 17 wherein said plate is a CsI plate.

21. An interferometer according to any of claims 18–20 wherein said beamsplitting coating is a layer of germanium.

22. In an interferometer having a beamsplitter element disposed on a flat or wedge-shaped plate and also using other optical elements to define distinct transmitted and reflected optical paths, the improvement comprising the use in combination with the other optical elements of the interferometer of a flat or wedge-shaped compensating element in one of said paths and the beamsplitter element in both of said paths, said optical paths passing through said plate only at the location of said beam splitter element, and wherein:

said beamsplitter element comprises a beamsplitter coating disposed on a portion of a first planar surface of said plate; and said optical elements in said transmitted optical path comprises a reflective coating disposed on another portion of said first planar surface of said plate.

23. The improvement according to claim 22 wherein said plate is a KBr plate.

24. The improvement according to claim 22 wherein said plate is a NaCl plate.

25. The improvement according to claim 22 wherein said plate is a CsI plate.

26. The improvement according to any of claims 23-25 wherein said beamsplitting coating is a layer of germanium.

27. In an interferometer of the type having a flat or wedge-shaped plate means having two approximately parallel planar surfaces for splitting an incident wavefront into two separate wavefronts and directing said wavefronts along separate paths of differing lengths, and for combining said separate wavefronts after said separate wavefronts have traversed said separate paths, the improvement comprising;

a beamsplitting coating disposed on a first portion of a first planar surface of said plate which first portion of the plate is the only portion thereof through which both said optical paths pass; and a reflective coating disposed on a second portion of said first planar wurface of said plate, said reflective coating for use as an optical element in the beamsplitter transmitted optical path.

28. The improvement according to claim 27 wherein said plate is a KBr plate.

29. The improvement according to claim 27 wherein said plate is a NaCl plate.

30. The improvement according to claim 27 wherein said plate is a CsI plate.

31. The improvement according to claim 28, 29 or 30 wherein said beamsplitting coating is a layer of germanium.

* * * * *